United States Patent
Schulz et al.

(10) Patent No.: US 10,823,258 B2
(45) Date of Patent: Nov. 3, 2020

(54) PLANETARY TRANSMISSION

(71) Applicant: Aktiebolaget SKF, Gothenburg (SE)

(72) Inventors: Ingo Schulz, Gerolzhofen (DE);
Wolfgang Glaentz, Schweinfurt (DE);
Tilmann Haar, Hassfurt (DE); Daniel Reck, Würzburg (DE)

(73) Assignee: AKTIEBOLAGET SKF, Gothenburg (SE)

(*) Notice: Subject to any disclaimer, the term of this patent is extended or adjusted under 35 U.S.C. 154(b) by 46 days.

(21) Appl. No.: 16/196,403

(22) Filed: Nov. 20, 2018

(65) Prior Publication Data
US 2019/0203806 A1    Jul. 4, 2019

(30) Foreign Application Priority Data
Jan. 3, 2018 (DE) .......................... 10 2018 200 056

(51) Int. Cl.
*F16H 1/28* (2006.01)
*F16H 55/17* (2006.01)

(52) U.S. Cl.
CPC ............. *F16H 1/2863* (2013.01); *F16H 1/28* (2013.01); *F16H 1/2836* (2013.01); *F16H 55/17* (2013.01); *F16H 2001/289* (2013.01); *F16H 2001/2881* (2013.01); *F16H 2055/178* (2013.01)

(58) Field of Classification Search
CPC .... F16H 1/2863; F16H 2055/185; F16H 1/28; F16H 1/2836; F16H 2055/178; F16H 55/17
See application file for complete search history.

(56) References Cited

U.S. PATENT DOCUMENTS

| | | | | |
|---|---|---|---|---|
| 5,540,630 | A * | 7/1996 | Vranish | F16H 1/2863 475/338 |
| 2003/0073537 | A1* | 4/2003 | Lloyd | F16H 1/2863 475/331 |
| 2010/0240490 | A1* | 9/2010 | Schafer | F16H 1/2863 475/347 |
| 2018/0087602 | A1* | 3/2018 | Koch | F16H 55/18 |

FOREIGN PATENT DOCUMENTS

| | | |
|---|---|---|
| DE | 4026886 A1 | 2/1992 |
| DE | 19603004 A1 | 7/1997 |
| DE | 102012207250 A1 | 11/2013 |
| DE | 102012211286 A1 | 1/2014 |
| JP | H04331849 A | 11/1992 |

OTHER PUBLICATIONS

"Spielfreier Zahnrader" Author: Han-Erich Maul Date: Jul. 2013.

* cited by examiner

*Primary Examiner* — Tisha D Lewis
(74) *Attorney, Agent, or Firm* — J-TEK Law PLLC; Scott T. Wakeman; Mark A. Ussai

(57) ABSTRACT

A planetary transmission includes first and second ring gears and a double planet with first and second gears rotatably disposed about a common shaft and arranged such that the gear teeth of the first gear of the double planet engage into the gear teeth of the first ring gear, and the gear teeth of the second gear of the double planet engage into the gear teeth of the second ring gear. The first gear of the double planet is preloaded in a clockwise direction such that the gear teeth of the first gear of the double planet are in contact with the gear teeth of the first ring gear, and the second gear of the double planet is preloaded in a counterclockwise direction such that the gear teeth of the second gear of the double planet are in contact with the gear teeth of the second ring gear.

12 Claims, 4 Drawing Sheets

PLANETARY TRANSMISSION

CROSS-REFERENCE

This application claims priority to German patent application no. 10 2018 200 056.5 filed on Jan. 3, 2018, the contents of which are fully incorporated herein by reference.

TECHNOLOGICAL FIELD

The present invention relates to a planetary transmission including first and second ring gear and at least one preloaded double planet.

BACKGROUND

Planetary transmissions usually include a plurality of gears. If the gear teeth of the gears of such a planetary transmission engage one-into-the-other, a clearance often arises between the gear teeth. For gears that rotate only in one direction this has no further influence since the gear teeth of two gears engaging one-into-the-other abut against each other once during start-up and then rotate with this abutment. A further abutting does not occur in further operation.

However, if the gears change their direction of rotation, for example, perform both a forward movement and a reverse movement, the clearance between the gears causes the gear teeth of the gears to impact against each other unevenly under certain circumstances. This can lead to an unwanted wear of the gears.

SUMMARY

It is therefore an aspect of the present disclosure to reduce a clearance between the gear teeth of gears in a planetary transmission.

Such a planetary transmission includes a first and a second ring gear as well as a first double planet. The first double planet includes a first and a second gear, which are rotatably disposed about a common shaft, wherein the gear teeth of the first gear of the first double planet engage into the gear teeth of the first ring gear, and wherein the gear teeth of the second gear of the first double planet engage into the gear teeth of the second ring gear.

In order to minimize a clearance between the gear teeth of the first double planet and of the ring gears, the first gear of the first double planet is preloaded in the clockwise direction such that the gear teeth of the first gear of the first double planet are in contact with the gear teeth of the first ring gear. In addition, the second gear of the first double planet is preloaded in the counterclockwise direction such that the gear teeth of the second gear of the first double planet are in contact with the gear teeth of the second ring gear. In this way the gear teeth of the gears of the first double planet are (tangentially) preloaded in two different directions, one in the clockwise direction, one counterclockwise, against the ring gears. Due to the preload there is thus already a contact between the gear teeth of the ring gears and the gear teeth of the gears of the double planet. In addition, due to the preload this contact is maintained in different directions even in operation, and a clearance between the gear teeth is avoided.

When the gears of the double planet are preloaded, they are fixed in their position with respect to each other. This can be effected, for example, by welding, soldering, or adhering. Alternatively the two gears can also include a spline that secures the two gears against each other when they are placed one-atop-the-other. This spline can be effective axially, i.e., the keys are incorporated in the surface of the gears that is perpendicular to the axis of rotation of the gears, or also radially, i.e., the keys are incorporated in the outer surface of the hub of a gear and in the inner bore of the other gear. The keys can also be incorporated on a separate carrier that is ultimately connected to the gears. If the two gears are joined to each other, the opposing key surfaces of the two gears slide against each other and thus generate the rotation of the gears until these come to abut against the flanks of the ring gears and thus generate the preload. In this state the two gears can be fixed to each other. If the two opposing key surfaces are configured such that they are located in the region of the self-locking, a permanent fixing can be omitted and the two gears can be pressed against each other by, for example, a spring force. This mechanism makes possible a continuous readjusting of the axial and thus also radial positions of the two gears with respect to each other, which in turn makes possible an automatic readjusting of the backlash elimination, e.g., in the case of wear on the tooth flanks.

The drive provided in a planetary transmission, i.e., an element that is driven by a shaft, can be implemented, for example, by one of the ring gears, wherein the other ring gear acts as an output. Since the first double planet is in contact with the first ring gear via one gear and is in contact with the second ring gear via the other gear, the movement of the ring gear acting as a drive is transmitted to the ring gear acting as an output. However, other combinations are also possible. For example, a planet carrier can be provided that acts as a drive. In addition, the planetary transmission can also include a sun gear.

If only one double planet is used, the two ring gears may deviate with respect to each other. In order to avoid this, according to one embodiment the planetary transmission can include a second double planet that includes a first gear and a second gear that are rotatably disposed about a common shaft, wherein the gear teeth of the first gear of the second double planet engage into the gear teeth of the first ring gear, and wherein the gear teeth of the second gear of the second double planet engage into the gear teeth of the second ring gear.

Due to the use of first and second double planets, the stability in the planetary transmission is improved. The second double planet prevents the first double planet from being displaced radially with respect to the first and second ring gears. This is possible since the first double planet and the second double planet are connected by a common planet carrier. For example, the planet carrier can act as a drive by which a force is transmitted from a shaft to the double planets and thereby to the ring gears.

In order to reduce the clearance in the planetary transmission for the second double planet and to prevent the ring gears from rotating against each other, the first gear of the second double planet can be preloaded counterclockwise such that the gear teeth of the first gear of the second double planet are in contact with the gear teeth of the first ring gear. In addition, the second gear of the second double planet can be preloaded in the clockwise direction such that the gear teeth of the second gear of the second double planet are in contact with the gear teeth of the second ring gear.

The clearance between the two ring gears and the double planet is prevented by the use of preloaded double planets. Due to the preload of the second double planet, which is opposite to the preload of the first double planet, a clearance between the gear teeth can be prevented even better. In addition, a uniform force distribution due to the two double planets holds the ring gears in position. In particular, the preload force here is the same for all gears.

According to one embodiment the planetary transmission includes a third double planet that includes a first and a second gear that are rotatably disposed about a common shaft, wherein the gear teeth of the first gear of the third double planet engage in the gear teeth of the first ring gear, and wherein the gear teeth of the second gear of the third double planet engage in the gear teeth of the second ring gear. Due to the third double planet the load capacity of the planetary transmission can be further increased. The three planets are preferably disposed at a 120° angle to each other. The load distribution in the planetary transmission can thereby be improved.

According to one embodiment the first gear of the third double planet is preloaded in the clockwise direction such that the gear teeth of the first gear of the third double planet are in contact with the gear teeth of the first ring gear. At the same time the second gear of the third double planet is preloaded in the counterclockwise direction such that the gear teeth of the second gear of the third double planet are in contact with the gear teeth of the second ring gear.

Due to the preload of the third double planet, which corresponds to the preload of the first double planet and is opposite to the preload of the second double planet, a clearance of the gear teeth in the planetary transmission is reduced for the third double planet.

According to one embodiment the planetary transmission includes a fourth double planet. The fourth double planet also includes a first and a second gear that are rotatably disposed about a common shaft, wherein the gear teeth of the first gear of the fourth double planet engage in the gear teeth of the first ring gear, and wherein the gear teeth of the second gear of the fourth double planet engage in the gear teeth of the second ring gear. Here the first gear of the fourth double planet is preloaded in the counterclockwise direction such that the gear teeth of the first gear of the fourth double planet are in contact with the gear teeth of the first ring gear. In addition, the second gear of the fourth double planet is preloaded in the clockwise direction such that the gear teeth of the second gear of the fourth double planet are in contact with the gear teeth of the second ring gear.

Due to the use of four double planets the clearance between the two ring gears and the double planets as well as rotation of the ring gears with respect to each other in all directions of rotation, i.e., forward and backward, can be prevented. Due to the preload of the fourth double planet, which corresponds to the preload of the second double planet, the clearance between the gear teeth of the gears of the fourth double planet and the gear teeth of the ring gears is reduced. Furthermore, by using a fourth double planet the load capacity can be increased.

In order to balance the load in the planetary transmission, the four double planets are preferably disposed respectively offset by 90°. Here the first and the second double planets are disposed offset by 90° to each other. The third and the fourth double planet are also offset by 90° to each other. The first and third double planet and the second and fourth double planet are each offset by 180°. In this way the different preload is uniformly distributed circumferentially.

According to a further embodiment, at least one of the double planets is preloaded radially outward. This means that at least one of the double planets is pressed toward the ring gears, i.e., is preloaded radially outward. In this way the gear teeth of at least one of the double planets have contact with the gear teeth of the ring gears not only on one side of the gear teeth, but on both sides of the gear teeth. This is preferred in particular with the use of three double planets. Here one of the double planets without preload can be provided with a preload, but only radially outward, by rotation of the gears.

In order to make possible the radially outward preload, at least one spring can be disposed in the planet carrier in order to preload the at least one double planet toward the ring gears.

Here the spring can exert a force on the at least one double planet that is sufficient to press the double planet toward the ring gears.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure is described in more detail on the basis of the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
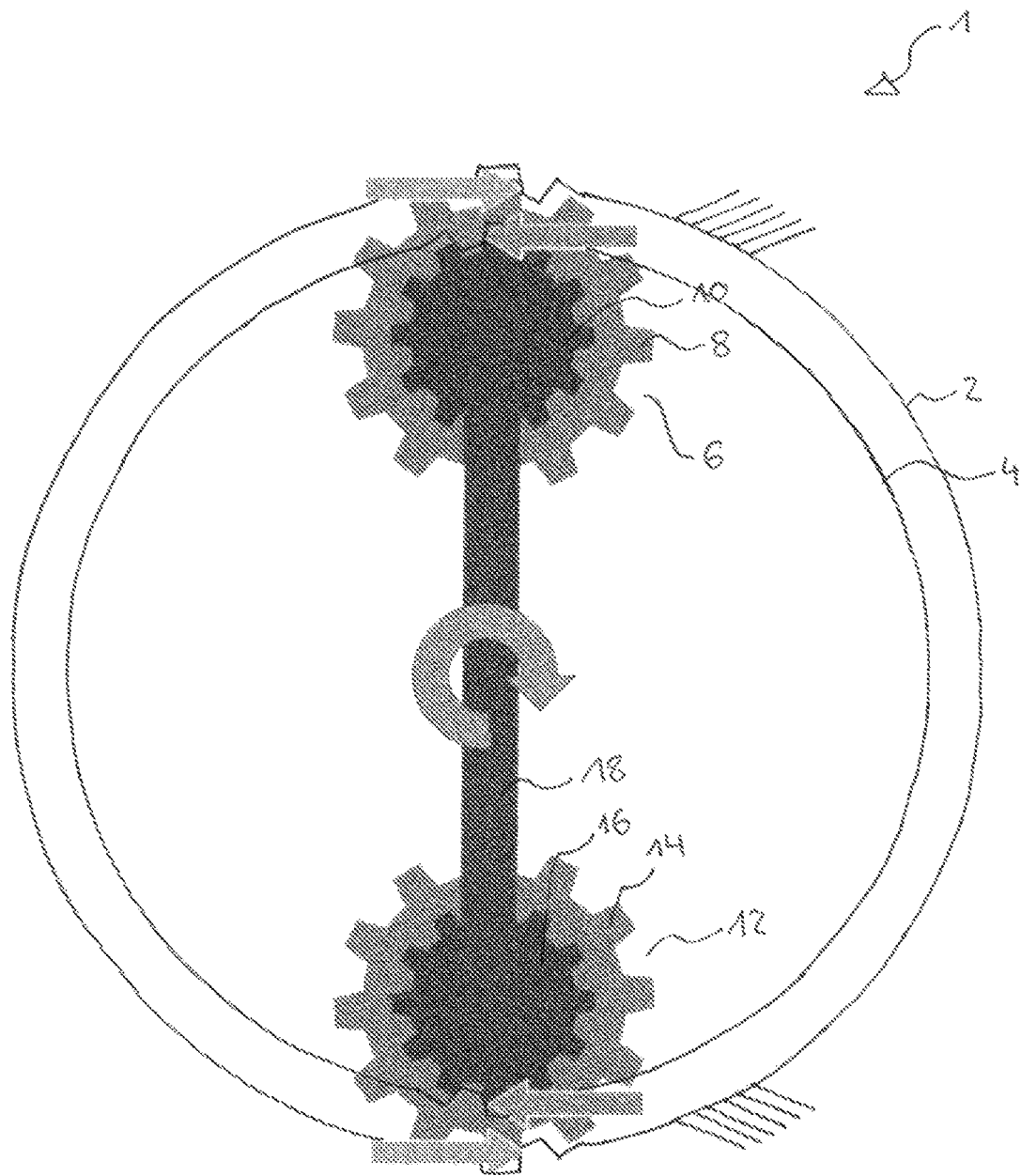
FIG. 1 is a sectional view of a first embodiment of a planetary transmission according to the present disclosure.

FIG. 1 shows a planetary transmission 1 that includes a first ring gear 2 and a second ring gear 4. Furthermore, the planetary transmission 1 includes a first double planet 6 as well as a second double planet 12. The two double planets 6, 12 are connected by a planet carrier 18 that is disposed between them. Alternatively the planetary transmission 1 can also include only one double planet 6. Furthermore, a sun gear (not shown) can be used.

In the embodiment shown in FIG. 1 the first ring gear 2 is larger than the second ring gear 4. Furthermore, the first ring gear 2 is fixed, wherein the planet carrier 18 acts as a drive that rotates in the direction of the arrow, and the second ring gear 4 acts as an output. Other designs as well as size ratios of the ring gears 2, 4 and double planets 6, 12 are also possible.

The two double planets 6, 12 each include two gears 8, 10 and 14, 16. Here the first gears 8, 14 are in contact with the first ring gear 2, and the second gears 10, 16 are in contact with the second ring gear 4.

In order to prevent a clearance between the gear teeth of the gears 8, 10, 14, 16 as well as of the ring gears 2, 4, the gears 8, 10, 14, 16 of the first and second double planets 6, 12 are preloaded. For this purpose the first gear 8 of the first double planet 6 is preloaded in the clockwise direction against the gear teeth of the first ring gear 2, as indicated by the arrow. The second gear 10 of the first double planet 6 is preloaded in the counterclockwise direction against the gear teeth of the second ring gear 4, as is also indicated by an arrow.

In an opposite manner, the first gear 14 of the second double planet 12 is preloaded counterclockwise against the gear teeth of the first ring gear 2, as indicated by the arrow. At the same time the second gear 16 of the second double planet 12 is preloaded counterclockwise against the gear teeth of the second ring gear 4, as indicated by the arrow. In this way a clearance between the gears 8, 10, 14, 16 can be prevented, which clearance in operation would adversely affect the planetary transmission 1.

Figure 2:
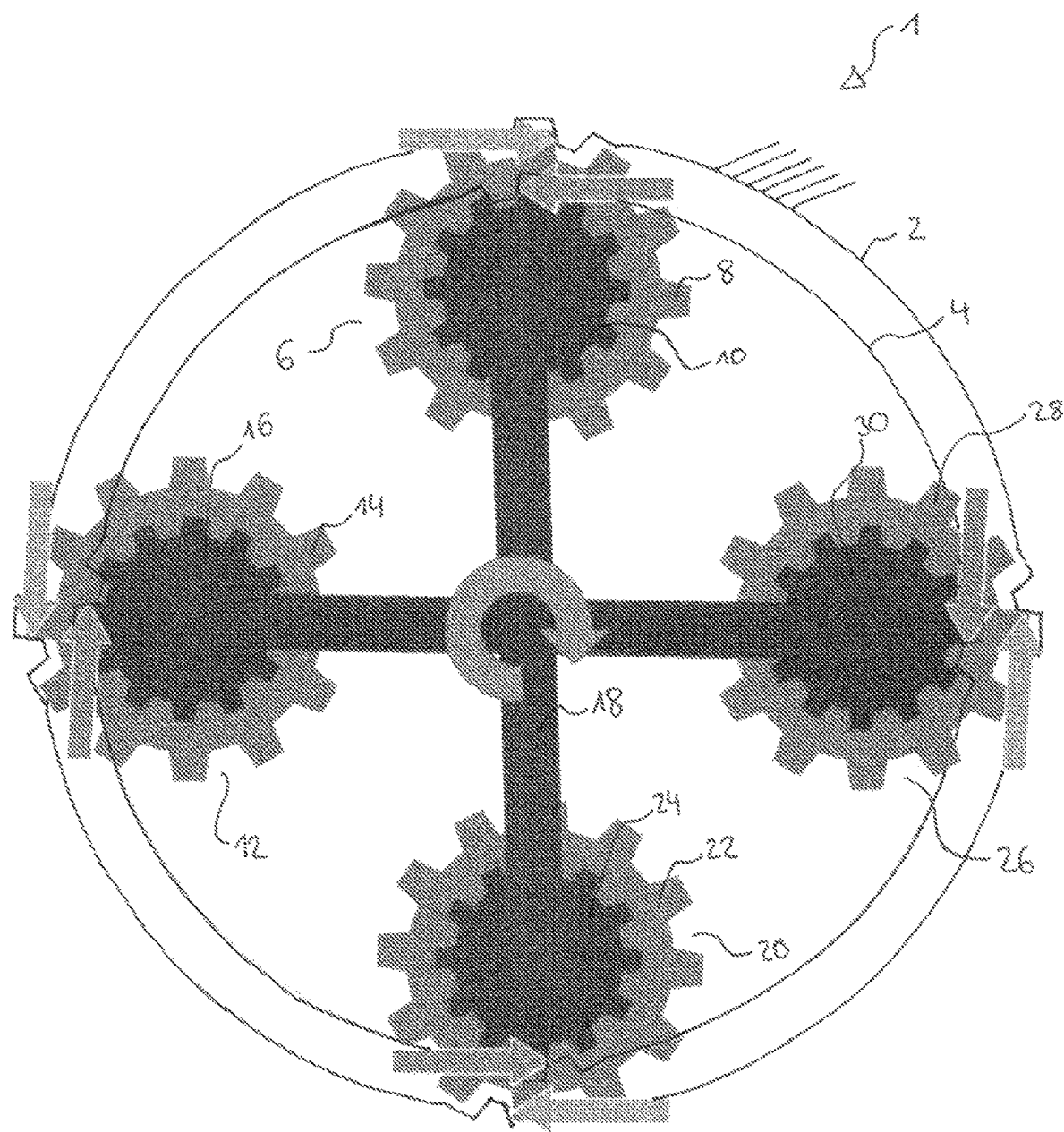
FIG. 2 is a sectional view of a second embodiment of a planetary transmission according to the present disclosure.

FIG. 2 includes a third and a fourth double planet 20, 26 in addition to the first and second double planet 6, 12. The four double planets 6, 12, 20, 26 are connected by the planet carrier 18. In order to now prevent a clearance between the gear teeth of the double planets as well as of the ring gears, all double planets 6, 12, 20, 26 are preloaded.

Here the first and second double planets 6, 12 are disposed at a 90° angle to each other. The third and fourth double planet 20, 26 are disposed inversely thereto. The third double planet also includes a first and second gear 22, 24, wherein the first gear 22 is in contact with the gear teeth of the first ring gear 2, and the second gear 24 is in contact with the gear teeth of the second ring gear 4. The first gear 22 is preloaded in the clockwise direction against the gear teeth of the first ring gear 2, and the second gear 24 is preloaded in the counterclockwise direction against the gear teeth of the second ring gear 4. A first and second gear 28, 30 of the fourth double planet 26 are preloaded inversely thereto. This means that the first gear 28 is preloaded in the counterclockwise direction against the gear teeth of the first ring gear 2, and the second gear 30 is preloaded in the clockwise direction against the gear teeth of the second ring gear 4.

Due to the use of four double planets 6, 12, 20, 26, on the one hand the load capacity of the entire planetary transmission 1 can be increased; a clearance between the gear teeth is simultaneously reduced by the preload of the four double planets 6, 12, 20, 26 in alternating form as viewed around the circumference of the ring gears 2, 4.

Figure 3:
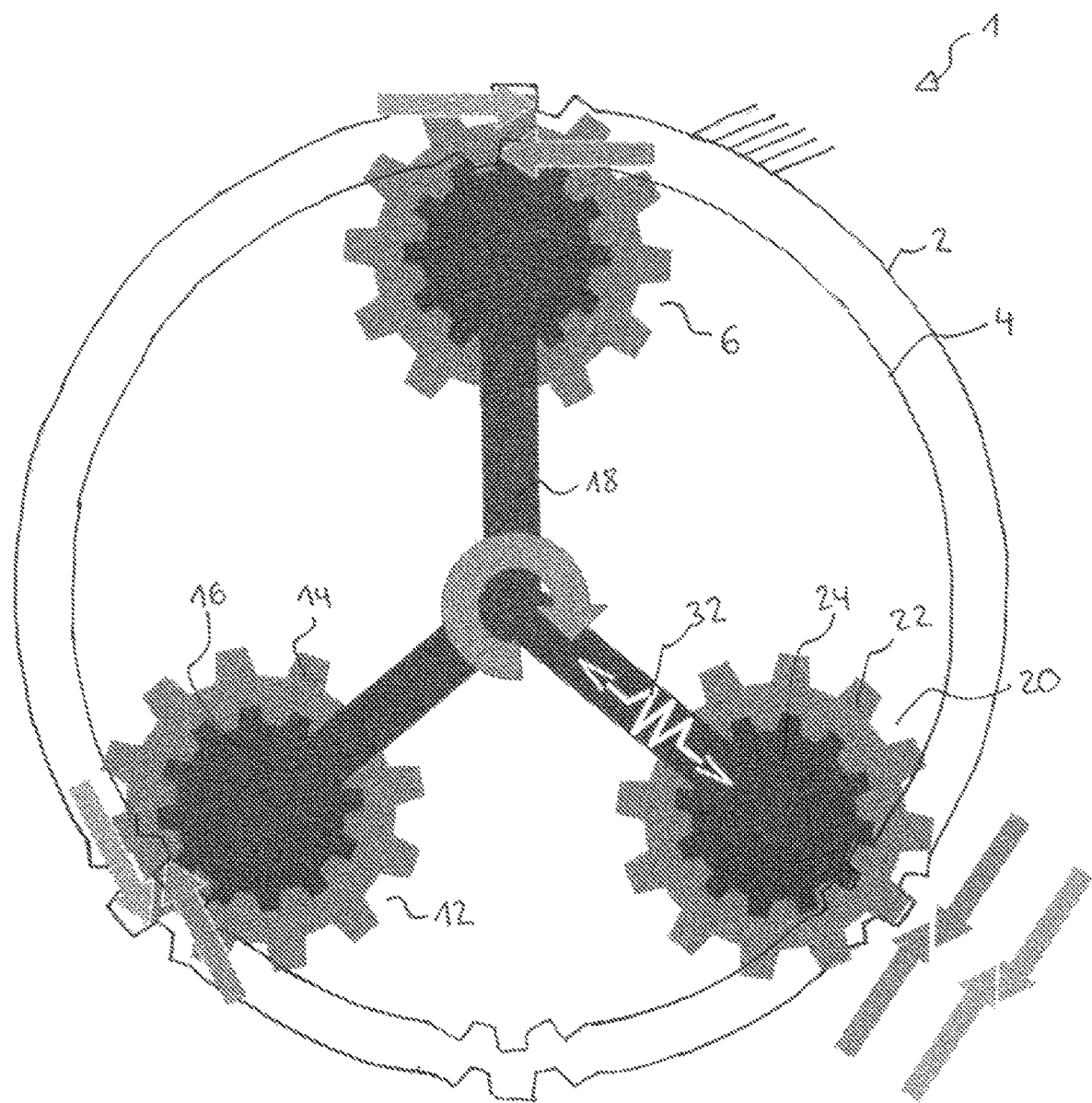
FIG. 3 is a sectional view of a third embodiment of a planetary transmission according to the present disclosure.

Alternatively also only three double planets 6, 12, 20 can be provided. This is depicted in FIG. 3. Here the three double planets 6, 12, 20 are disposed at a 120° angle to each other. Here the third double planet 20 can correspond in its preload of the gears 22, 24 either to the preload of the first double planet 6 or of the second double planet 12.

In addition, in the planet carrier 18 a spring 32 can be provided that presses the third double planet 20 against the gear teeth of the first and second ring gear 2, 4. In this way the gear teeth of the first and second gear 22, 24 of the third double planet 20 are in contact with the gear teeth of the first and second ring gear 2, 4 not only on one side of the teeth but rather on both. In this way a clearance can be optimally reduced even with a use of three double planets.

Figure 4:
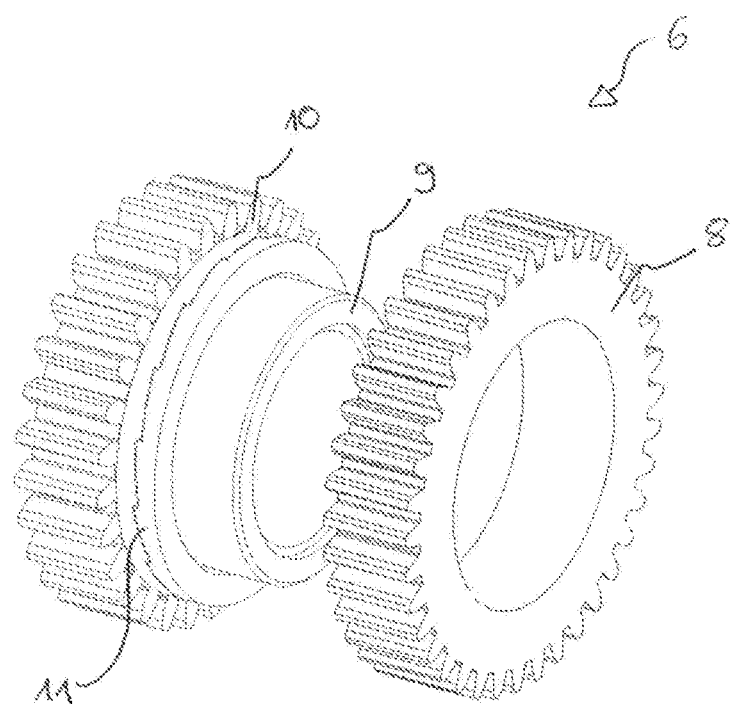
FIG. 4 is an exploded view of a double planet usable in the above embodiments.

FIG. 4 shows by way of example how the two gears 8, 10 of a double planet 6 can be attached to each other. For this purpose the gear 10 includes a hub 9 that can be introduced into the gear 8 in order to place the gears one-atop-the-other. In order to secure the two gears 8, 10 to each other, a spline 11 is provided that is axially effective. i.e., the keys are incorporated in the surface of the gears 8, 10 that is perpendicular to the axis of rotation of the gears 8, 10. Alternatively the keys can also be radially effective and can be incorporated in the outer surface of the hub on a gear wheel and in the inner bore of the other gear wheel.

If the two gears 8, 10 are joined to one another, the opposing key surfaces 11 of the two gears 8, 10 slide against each other and thus generate the rotation of the gears 8, 10 until these come into abutment against the flanks of the ring gears 2, 4 and thus generate the preload. In this state the two gears can be fixed to each other, for example, by adhering or welding. If the two opposing key surfaces 11 are configured such that they are located in the region of the self-locking, a permanent fixing can be omitted and the two gears 8, 10 are pressed against each other, for example, by a spring force.

Due to the preload of the gears of the individual double planets a clearance between the gear teeth of the gears of the double planets as well as of the ring gears can be minimized.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved planetary transmissions.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Planetary transmission
2 First ring gear
4 Second ring gear
6 First double planet
8 First gear
9 Hub
10 Second gear
11 Spline
12 Second double planet
14 First gear
16 Second gear
18 Planet carrier
20 Third double planet
22 First gear
24 Second gear
26 Fourth double planet
28 First gear
30 Second gear
32 Spring

What is claimed is:

1. A planetary transmission comprising:
a first ring gear;
a second ring gear;
a first double planet that includes a first gear having gear teeth and a second gear having gear teeth, the first and second gears being rotatably disposed about a first common shaft, and
a second double planet that includes a first gear having gear teeth and a second gear having gear teeth, the first and second gears of the second double planet being rotatably disposed about a second common shaft,
wherein the gear teeth of the first gear of the first double planet engage into the gear teeth of the first ring gear,
wherein the gear teeth of the second gear of the first double planet engage into the gear teeth of the second ring gear,
wherein the first gear of the first double planet is preloaded in a clockwise direction such that the gear teeth of the first gear of the first double planet are in contact with the gear teeth of the first ring gear,
wherein the second gear of the first double planet is preloaded in a counterclockwise direction such that the gear teeth of the second gear of the first double planet are in contact with the gear teeth of the second ring gear,
wherein the gear teeth of the first gear of the second double planet engage into the gear teeth of the first ring gear,
wherein the gear teeth of the second gear of the second double planet engage into the gear teeth of the second ring gear,
wherein the first gear of the second double planet is preloaded in the counterclockwise direction such that the gear teeth of the first gear of the second double planet are in contact with the gear teeth of the first ring gear, and
wherein the second gear of the second double planet is preloaded in the clockwise direction such that the gear teeth of the second gear of the second double planet are in contact with the gear teeth of the second ring gear.

2. The planetary transmission according to claim 1, wherein the first double planet and the second double planet are driven by a common planet carrier.

3. The planetary transmission according to claim 1, including a third double planet that includes a first gear and a second gear that are rotatably disposed about a third common shaft,
wherein the gear teeth of the first gear of the third double planet engage into the gear teeth of the first ring gear, and
wherein the gear teeth of the second gear of the third double planet engage into the gear teeth of the second ring gear.

4. The planetary transmission according to claim 3, wherein the first gear of the third double planet is preloaded in the clockwise direction such that the gear teeth of the first gear of the third double planet are in contact with the gear teeth of the first ring gear, and
wherein the second gear of the third double planet is preloaded in the counterclockwise direction such that the gear teeth of the second gear of the third double planet are in contact with the gear teeth of the second ring gear.

5. The planetary transmission according to claim 3, including a fourth double planet that includes a first gear and a second gear that are rotatably disposed about a fourth common shaft,
wherein the gear teeth of the first gear of the fourth double planet engage into the gear teeth of the first ring gear,
wherein the gear teeth of the second gear of the fourth double planet engage into the gear teeth of the second ring gear,
wherein the first gear of the fourth double planet is preloaded in the counterclockwise direction such that the gear teeth of the first gear of the fourth double planet are in contact with the gear teeth of the first ring gear, and
wherein the second gear of the fourth double planet is preloaded in the clockwise direction such that the gear teeth of the second gear of the fourth double planet are in contact with the gear teeth of the second ring gear.

6. The planetary transmission according to claim 5, wherein the first and the third double planets are offset by 180°, wherein the second and the fourth double planet are offset by 180°, wherein the first and the second double planet are offset by 90°, and wherein the third and the fourth double planet are offset by 90°.

7. The planetary transmission according to claim 2, wherein the first double planet and/or the second double planet is preloaded radially outward.

8. A planetary transmission comprising:
a first ring gear;
a second ring gear; and
a first double planet that includes a first gear having gear teeth and a second gear having gear teeth, the first and second gears being rotatably disposed about a first common shaft,
a second double planet that includes a first gear having gear teeth and a second gear having gear teeth, the first and second gears of the second double planet being rotatably disposed about a second common shaft,
wherein the gear teeth of the first gear of the first double planet engage into the gear teeth of the first ring gear,
wherein the gear teeth of the second gear of the first double planet engage into the gear teeth of the second ring gear,
wherein the first gear of the first double planet is preloaded in a clockwise direction such that the gear teeth of the first gear of the first double planet are in contact with the gear teeth of the first ring gear,
wherein the second gear of the first double planet is preloaded in a counterclockwise direction such that the gear teeth of the second gear of the first double planet are in contact with the gear teeth of the second ring gear,
wherein the gear teeth of the first gear of the second double planet engage into the gear teeth of the first ring gear, and
wherein the gear teeth of the second gear of the second double planet engage into the gear teeth of the second ring gear
wherein the first double planet and the second double planet are driven by a common planet carrier, and
wherein the first double planet is preloaded radially outward by
at least one spring disposed in the planet carrier.

9. The planetary transmission according to claim 6, wherein the first double planet and/or the second double planet is preloaded radially outward.

10. A planetary transmission comprising:

a first ring gear;

a second ring gear;

a first double planet that includes a first gear having gear teeth and a second gear having gear teeth, the first and second gears being rotatably disposed about a first common shaft, wherein the gear teeth of the first gear of the first double planet engage into the gear teeth of the first ring gear and wherein the gear teeth of the second gear of the first double planet engage into the gear teeth of the second ring gear, a second double planet that includes a first gear having gear teeth and a second gear having gear teeth, the first and second gears of the second double planet being rotatably disposed about a second common shaft, wherein the gear teeth of the first gear of the second double planet engage into the gear teeth of the first ring gear, and the gear teeth of the second gear of the second double planet engage into the gear teeth of the second ring gear, a third double planet that includes a first gear and a second gear that are rotatably disposed about a third common shaft, wherein the gear teeth of the first gear of the third double planet engage into the gear teeth of the first ring gear, and the gear teeth of the second gear of the third double planet engage into the gear teeth of the second ring gear, and a fourth double planet that includes a first gear and a second gear that are rotatably disposed about a fourth common shaft, wherein the gear teeth of the first gear of the fourth double planet engage into the gear teeth of the first ring gear and the gear teeth of the second gear of the fourth double planet engage into the gear teeth of the second ring gear, wherein the first gear of the first double planet is preloaded in a clockwise direction such that the gear teeth of the first gear of the first double planet are in contact with the gear teeth of the first ring gear, wherein the second gear of the first double planet is preloaded in a counterclockwise direction such that the gear teeth of the second gear of the first double planet are in contact with the gear teeth of the second ring gear, wherein the first gear of the fourth double planet is preloaded in the counterclockwise direction such that the gear teeth of the first gear of the fourth double planet are in contact with the gear teeth of the first ring gear, and wherein the second gear of the fourth double planet is preloaded in the clockwise direction such that the gear teeth of the second gear of the fourth double planet are in contact with the gear teeth of the second ring gear, wherein the first and the third double planets are offset by 180°, wherein the second and the fourth double planet are offset by 180°, wherein the first and the second double planet are offset by 90°, and wherein the third and the fourth double planet are offset by 90°, and wherein the first double planet is preloaded radially outward by at least one spring disposed in the planet carrier.

11. The planetary transmission according to claim 1, wherein the first double planet and the second double planet are driven by a common planet carrier, and wherein the first double planet and/or the second double planet is preloaded radially outward by at least one spring disposed in the planet carrier.

12. The planetary transmission according to claim 1, including a third double planet that includes a first gear and a second gear that are rotatably disposed about a third common shaft, and including a fourth double planet that includes a first gear and a second gear that are rotatably disposed about a fourth common shaft, wherein the gear teeth of the first gear of the third double planet engage into the gear teeth of the first ring gear, and wherein the gear teeth of the second gear of the third double planet engage into the gear teeth of the second ring gear, wherein the gear teeth of the first gear of the fourth double planet engage into the gear teeth of the first ring gear, wherein the gear teeth of the second gear of the fourth double planet engage into the gear teeth of the second ring gear, wherein the first gear of the fourth double planet is preloaded in the counterclockwise direction such that the gear teeth of the first gear of the fourth double planet are in contact with the gear teeth of the first ring gear, wherein the second gear of the fourth double planet is preloaded in the clockwise direction such that the gear teeth of the second gear of the fourth double planet are in contact with the gear teeth of the second ring gear, wherein the first and the third double planets are offset by 180°, wherein the second and the fourth double planet are offset by 180°, wherein the first and the second double planet are offset by 90°, and wherein the third and the fourth double planet are offset by 90°, wherein the first double planet is preloaded radially outward by at least one spring disposed in the planet carrier.

* * * * *